(12) United States Patent
Romanovskiy

(10) Patent No.: US 9,778,881 B2
(45) Date of Patent: Oct. 3, 2017

(54) TECHNIQUES FOR AUTOMATICALLY FREEING SPACE IN A LOG-STRUCTURED STORAGE SYSTEM BASED ON SEGMENT FRAGMENTATION

(71) Applicant: EMC Corporation, Hopkinton, MA (US)

(72) Inventor: Alexey Valentinovich Romanovskiy, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 14 days.

(21) Appl. No.: 14/767,387

(22) PCT Filed: Jun. 27, 2014

(86) PCT No.: PCT/RU2014/000470
§ 371 (c)(1),
(2) Date: Aug. 12, 2015

(87) PCT Pub. No.: WO2015/199574
PCT Pub. Date: Dec. 30, 2015

(65) Prior Publication Data
US 2016/0253104 A1 Sep. 1, 2016

(51) Int. Cl.
*G06F 13/00* (2006.01)
*G06F 3/06* (2006.01)
(Continued)

(52) U.S. Cl.
CPC ............ *G06F 3/0661* (2013.01); *G06F 3/064* (2013.01); *G06F 3/065* (2013.01); *G06F 3/0608* (2013.01);
(Continued)

(58) Field of Classification Search
CPC .. G06F 3/0661; G06F 12/0871; G06F 3/0652; G06F 3/0619; G06F 3/064; G06F 3/0608; G06F 12/0261; G06F 3/0673; G06F 3/065; G06F 12/123; G06F 12/0246; G06F 12/0868; G06F 12/0855; G06F 2212/608;
(Continued)

(56) References Cited

U.S. PATENT DOCUMENTS 5,170,479 A 12/1992 Takamoro
6,038,636 A 3/2000 Brown, III et al.
(Continued)

*Primary Examiner* — Hong Kim
(74) *Attorney, Agent, or Firm* — BainwoodHuang

(57) ABSTRACT

A method includes (a) writing blocks of data to a storage device, pluralities of the blocks of data being organized into macroblocks, macroblocks having a first fixed size, pluralities of the macroblocks being organized into segments, segments having a second fixed size, (b) marking some of the written blocks as deleted, (c) computing a ratio of storage marked as deleted (SMD) from a segment and storage written (SW) to the segment (ratio SMD:SW), and (d) in response to the computed ratio exceeding a threshold value, performing a compaction operation on the segment. Performing the compaction operation on the segment includes (1) copying blocks which have not been marked as deleted from within macroblocks that contain at least one block marked as deleted to a new macroblock of the first fixed size and (2) in response to copying, marking the macroblocks from which the blocks were copied as free for reuse.

20 Claims, 4 Drawing Sheets

(51) Int. Cl.
- *G06F 12/02* (2006.01)
- *G06F 12/0855* (2016.01)
- *G06F 12/0868* (2016.01)
- *G06F 12/123* (2016.01)
- *G06F 12/0871* (2016.01)

(52) U.S. Cl.
CPC .......... *G06F 3/0619* (2013.01); *G06F 3/0652* (2013.01); *G06F 3/0673* (2013.01); *G06F 12/0246* (2013.01); *G06F 12/0261* (2013.01); *G06F 12/0855* (2013.01); *G06F 12/0868* (2013.01); *G06F 12/0871* (2013.01); *G06F 12/123* (2013.01); *G06F 2212/1024* (2013.01); *G06F 2212/1044* (2013.01); *G06F 2212/281* (2013.01); *G06F 2212/313* (2013.01); *G06F 2212/401* (2013.01); *G06F 2212/461* (2013.01); *G06F 2212/608* (2013.01); *G06F 2212/7205* (2013.01); *G06F 2212/7207* (2013.01)

(58) Field of Classification Search
CPC ....... G06F 2212/1024; G06F 2212/281; G06F 2212/313; G06F 2212/1044; G06F 2212/7207; G06F 2212/7205; G06F 2212/461; G06F 2212/401
USPC ....... 707/813, 693, 662, 745, 828, 800, 821; 711/170, 156; 708/203; 710/68
See application file for complete search history.

(56) References Cited

U.S. PATENT DOCUMENTS

2013/0198438 A1    8/2013   Masuo et al.
2016/0364180 A1*   12/2016   Romanovskiy ..... G06F 12/0246

* cited by examiner

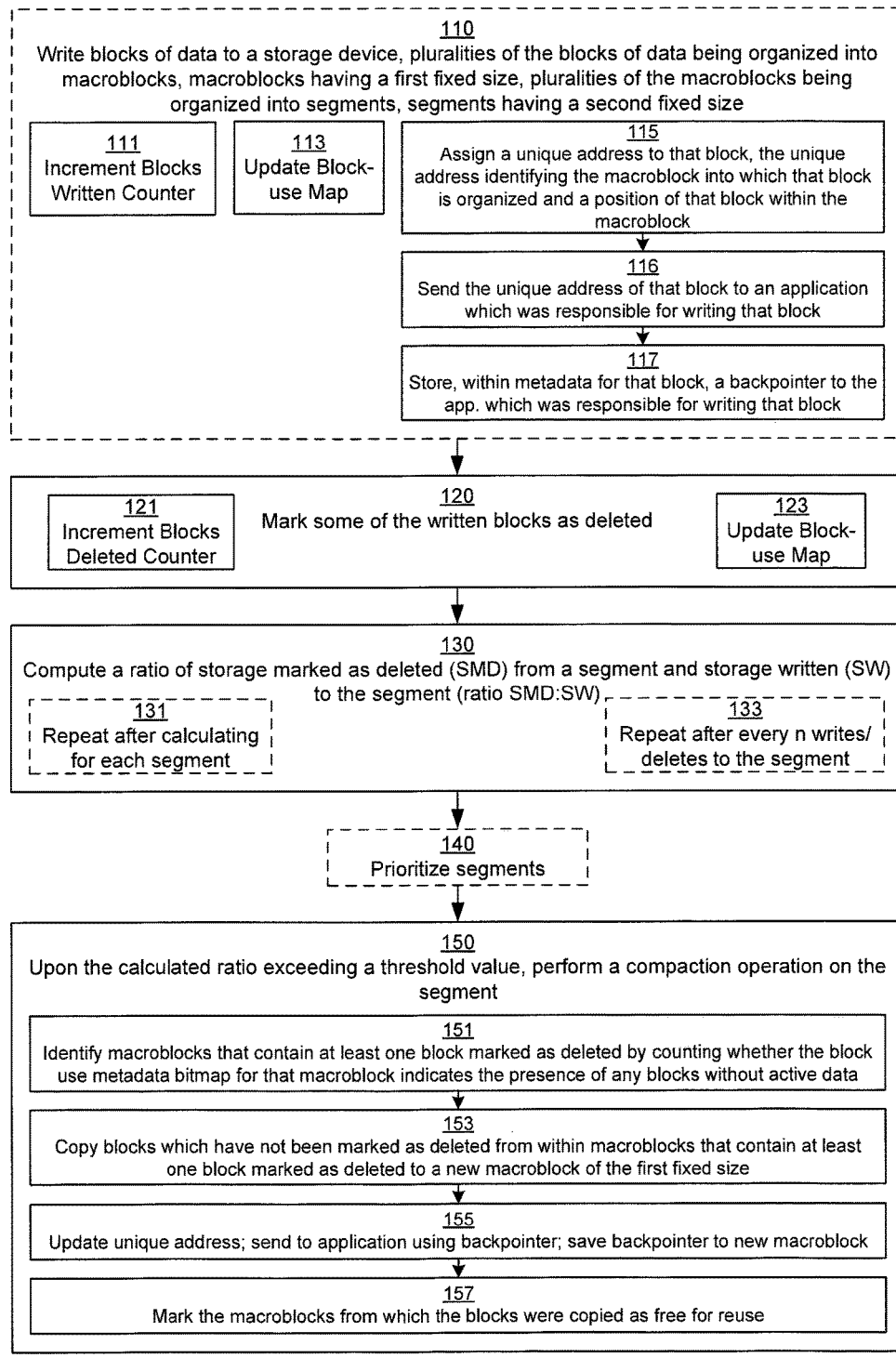

TECHNIQUES FOR AUTOMATICALLY FREEING SPACE IN A LOG-STRUCTURED STORAGE SYSTEM BASED ON SEGMENT FRAGMENTATION

BACKGROUND

Data storage systems are used to store large quantities of data on arrays of persistent storage devices. In some situations, it may be desirable to provide block-based access to applications running on a host computing system. The speed of these systems may be optimized by sequentially writing blocks of data, similar to a log-structured filesystem.

SUMMARY

Unfortunately, the above-described techniques may suffer from deficiencies when blocks are deleted or rewritten. These actions result in previously-written blocks becoming unused, but no longer available for sequential writing. Thus, these systems may be said to leak storage space.

It is possible to organize the data storage system into macroblocks containing several sequential blocks, and, once all blocks within a macroblock have been deleted or rewritten, to free that macroblock for future writes. However, even this approach may not suffice to free storage space at an efficient rate.

In order to alleviate these deficiencies, it would be desirable for a data storage system to implement a garbage collection or defragmentation system, to allow fragmented macroblocks to be combined with other fragmented macroblocks, thereby allowing macroblocks to be freed. This may be accomplished by organizing macroblocks into larger segments, maintaining metadata about writes and deletions performed on each segment, and performing a data compaction feature on macroblocks of a segment when its metadata indicates that it is highly fragmented.

One embodiment of the improved techniques is directed to a method of reclaiming storage. The method includes (a) writing blocks of data to a storage device, pluralities of the blocks of data being organized into macroblocks, macroblocks having a first fixed size, pluralities of the macroblocks being organized into segments, segments having a second fixed size, (b) marking some of the written blocks as deleted, (c) computing a ratio of storage marked as deleted (SMD) from a segment and storage written (SW) to the segment (ratio SMD:SW), and (d) in response to the computed ratio exceeding a threshold value, performing a compaction operation on the segment. Performing the compaction operation on the segment includes (1) copying blocks which have not been marked as deleted from within macroblocks that contain at least one block marked as deleted to a new macroblock of the first fixed size and (2) in response to copying, marking the macroblocks from which the blocks were copied as free for reuse. Other embodiments are directed to a system, a computerized apparatus, and a computer program product for performing methods similar to that described above.

These embodiments are advantageous because they allow a data storage system to reclaim storage space from highly-fragmented areas.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 depicts an example method according to various embodiments.

DETAILED DESCRIPTION

Embodiments are directed to techniques for defragmenting garbage collection in a data storage system. These may be accomplished by organizing macroblocks into larger segments, maintaining metadata about writes and deletions performed on each segment, and performing a data compaction feature on macroblocks of a segment when its metadata indicates that it is highly fragmented.

Figure 1:
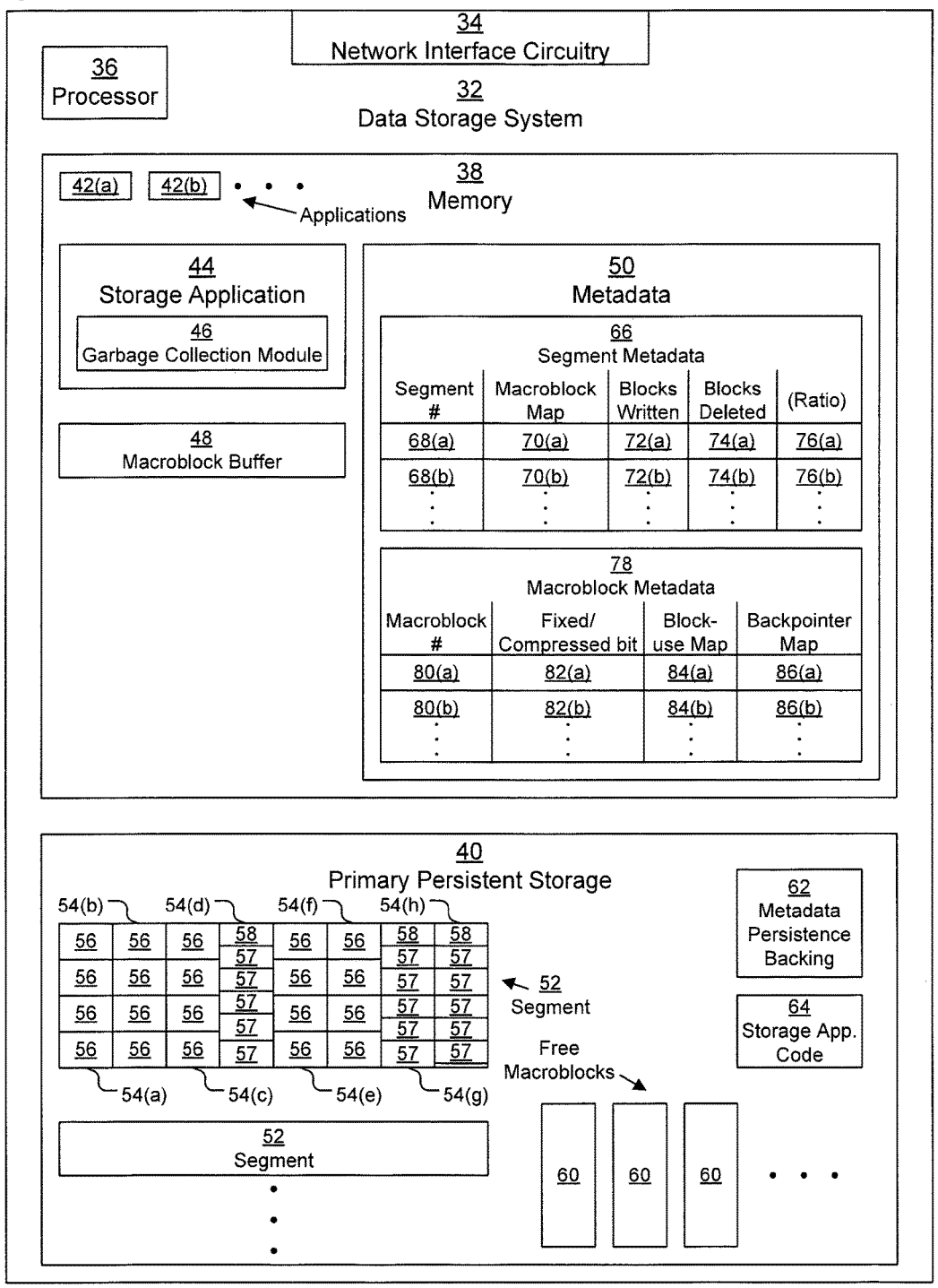
FIG. 1 depicts an example data storage system according to various embodiments.

FIG. 1 depicts an example data storage system (DSS) 32. DSS 32 may be any kind of computing device that provides storage, such as, for example, a personal computer, a workstation computer, a server computer, an enterprise server computer, a laptop computer, a tablet computer, a smart phone, etc. Typically, however, DSS 32 will be a data storage array, such as, for example, a VNX®, VNXe®, or CLARiiON® CX4 data storage array provided by the EMC Corporation of Hopkinton, Mass.

DSS 32 includes a processor, 36, system memory 38, and primary persistent storage 40. In some embodiments, DSS 32 also includes network interface circuitry 34 for communicating with one or more host devices configured to send data storage commands to the DSS 32. Network interface circuitry 34 may include one or more Ethernet cards, cellular modems, Wireless Fidelity (WiFi) wireless networking adapters, any other devices for connecting to a network, or some combination thereof.

Processor 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Processor 36 may also include processing circuitry configured to control and connect to the primary persistent storage 40.

Memory 38 may be any kind of digital system memory, such as, for example, random access memory (RAM). Memory 38 stores an operating system (OS) (not depicted, e.g., Linux, UNIX, Windows, or a similar operating system) and one or more applications 42 (depicted as applications 42(a), 42(b), . . .) executing on processor 36 as well as data used by those applications 42.

It should be understood that network interface circuitry 34, processor 36, and memory 38 interconnect, and they all may reside on a storage processor board or motherboard of the DSS 32. There may be multiple independent storage processor boards per DSS 32, arranged in a highly-available fault-tolerant manner.

Primary persistent storage 40 may be made up of a set of persistent storage devices, such as, for example, hard disk drives, solid-state storage devices, flash drives, etc. Primary persistent storage 40 is configured to store blocks 56, 57 of data within macroblocks 54 so as to be easily accessible to applications 42 via storage application 44. In some embodiments, DSS 32 may include (or otherwise have access to) secondary persistent storage (not depicted), which is used for secondary purposes, such as backup. Secondary persistent storage may include, for example, tape or optical storage.

Memory 38 also stores a storage application 44 as it executes on processor 36, as well as a macroblock buffer 48 and metadata 50. Storage application 44 is an application that receives and processes storage commands from applications 42 (or, via network interface circuitry 34, from other applications executing on remote host devices) that are directed to the primary persistent storage 40. Part of storage application 44 is a garbage collection module 46, which is configured to perform defragmenting garbage collection on primary persistent storage 40 with reference to the metadata 50. In some embodiments, metadata 50 may be backed up onto metadata persistence backing 62 on primary persistent storage 40 or some other non-volatile storage.

Typically, code for the OS, applications 42, storage application 44, and garbage collection module 46 is also stored within some form of persistent storage, either on a dedicated persistent boot drive or within the primary persistent storage 40, so that these components can be loaded into system memory 38 upon startup. An application or module 42, 44, 46, when stored in non-transient form either in system memory 38 or in persistent storage, forms a computer program product. The processor 36 running one or more of these applications of modules 42, 44, 46 thus forms a specialized circuit constructed and arranged to carry out various processes described herein. Code for storage application 44 is depicted as being stored as code 64 within primary persistent storage 40.

Storage application 44 stores data blocks received from applications 42 as either uncompressed blocks 56 or compressed blocks 57 on primary persistent storage 40. Typically, storage application 44 stores these blocks 56, 57 in sequential order within a macroblock 54 and writes macroblock metadata 78 regarding each macroblock 54 to memory 38 within metadata 50.

Each macroblock 54 is a contiguous region of storage (i.e., having contiguous addresses) within primary persistent storage 40. In addition to used macroblocks 54, primary persistent storage 40 may also include a set of free macroblocks 60, which are not currently allocated to store any data blocks 56, 57. Typically, all macroblocks 54, 60 have a fixed size, and uncompressed blocks 56 have a different, smaller, fixed size. In one embodiment, each macroblock 54, 60 is 64 kilobytes in size, which allows it to store eight 8-kilobyte uncompressed blocks 56. In another embodiment, each macroblock 54, 60 is 1 megabyte in size, which allows it to store sixteen 64-kilobyte uncompressed blocks 56. However, as depicted, for the sake of simplicity, each macroblock 54, 60 can store four blocks 56 (for example, each macroblock 54, 60 is 32 kilobytes, capable of storing four 8-kilobyte blocks 56).

In some embodiments, instead of storing uncompressed data blocks 56, some of the macroblocks 54 may be configured to store several compressed blocks 57. In such embodiments, these macroblocks (e.g., 54($d$), 54($f$), 54($h$)) configured to store compressed blocks 57 have a header 58 which stores macroblock-level metadata. Typically, a macroblock 54 only stores compressed blocks 57 if there is enough room within the macroblock 54 to store more compressed blocks 57 than it could store uncompressed blocks 56. Thus, since, as depicted, a macroblock 54, 60 can store four 8-kilobyte uncompressed blocks 56, a macroblock 54 only stores compressed blocks 57 if it can hold at least five compressed blocks 57 (see, e.g., macroblocks 54($d$), 54($f$), 54($h$)).

Each macroblock 54, 60 has associated macroblock metadata 78. Typically, primary persistent storage 40 is divided in advance into a fixed number of macroblocks 54, 60. In some embodiments, primary persistent storage 40 is configured to store up to eight petabytes ($2^{53}$ bytes) of application data. Thus, in embodiments having a fixed macroblock size of 1 megabyte ($2^{20}$ bytes), each macroblock 54, 60 has an associated 33-bit macroblock number 80 (depicted as macroblock numbers 80($a$), 80($b$), . . .), representing numbers from zero to $2^{33}-1$. Similarly, in embodiments having a fixed macroblock size of 64 kilobytes ($2^{16}$ bytes), each macroblock 54, 60 has an associated 37-bit macroblock number 80, representing numbers from zero to $2^{37}-1$. Macroblock metadata 78 is depicted as a table indexed to the macroblock number 80, with several columns for metadata elements 82, 84, 86, although this is by way of example only. In other embodiments, each metadata element 82, 84, 86 may be stored within a separate array indexed by the macroblock numbers 80, and in yet other embodiments, groups of metadata elements (e.g., 82, 84) may be combined into a single such array. However, for purposes of simplicity of description, each metadata element 82, 84, 86 will be described as being stored within a column of a table indexed to the macroblock number 80.

Metadata element 82 stores a single bit flag per macroblock 54, 60, which indicates whether (1) the associated macroblock 54 is configured to store uncompressed data blocks 56 or (0) the associated macroblock 54 is configured to store compressed data blocks 57.

Block-use map element 84 stores a bitmap per macroblock 54, 60. Block-use map element 84 stores one bit per block 56, 57 for up to a maximum number of compressed blocks 56 allowed per macroblock 54, 60. In the case of a macroblock 54 configured to store uncompressed blocks 56, only the first few bits are utilized within block-use map element 84. Thus, in one embodiment, block-use map element 84 contains 63 bits, particularly if block-use map element 84 is stored in conjunction with metadata element 82, the metadata element 82 being the first bit of a long 64-bit integer, and the block-use map element 84 being the last 63 bits of the long 64-bit integer.

In the case of a macroblock 54 configured to store uncompressed blocks 56, only the first four or eight or sixteen (depending on the embodiment) bits of the block-use map element 84 are actually considered. If one of these initial bits of the block-use map element 84 stores a one (1), then the corresponding uncompressed block 56 stores active data, which means it has had data written to it, and it has not yet been deleted or rewritten. If, on the other hand, one of these initial bits of the block-use map element 84 stores a zero (0), then the corresponding compressed block 56 does not store active data, which means it has either been deleted or rewritten. However, any bit after the first four, eight, or sixteen (or whatever number of uncompressed blocks is able to fit in a macroblock 54, depending on the embodiment) bits does not actually represent any block 56 (i.e., that macroblock 54 is only configured to store 4, 8, 16, etc. uncompressed blocks 56, so any bit after those initial bits will be zero by default).

Turning now to the case of a macroblock 54 configured to store compressed blocks 57, only the first m bits are considered, where m represents the number of compressed blocks 57 assigned to that macroblock 54. If one of these first m bits of the block-use map element 84 stores a one (1), then the corresponding compressed block 57 stores active data, which means it has had data written to it, and it has not yet been deleted or rewritten. On the other hand, if one of these first m bits of the block-use map element 84 stores a zero (0), then the corresponding compressed block 57 does not store active data, which means it has either been deleted or rewritten. However, any bit after the first m bits does not actually represent any block 57 (i.e., that macroblock 54 is only configured to store m compressed blocks 57, so any bit after the first m bits will be zero by default).

Backpointer map element 86 stores, for each block 56, 57 within a respective macroblock 54, a pointer back to a block parent data structure of a respective application 42 that was responsible for creating that block 56, 57. The block parent data structure is used by applications 42 to access blocks 56, 57, e.g. to read, delete, or over-write respective blocks 56, 57, to construct files/objects consisting of blocks, etc. Thus, if DSS 32 is configured to store up to eight petabytes ($2^{53}$ bytes) of application data, then the backpointers may each be at least 64 bits, and there should be enough space allocated within macroblock metadata 78 to store up to the maximum number of compressed blocks 57 allowed per macroblock 54 (e.g., up to 63 compressed blocks 57 are allowed, so 63×64 bits=4,032 bits=504 bytes, which may be rounded up to 512 bytes, of storage allocated within the backpointer map element 86 for each macroblock 54). Combining backpointer map elements 86 for several macroblocks 54 to fit into a single block, e.g. 8 kilobytes or 64 kilobytes, one can apply compression to such a block storing a combination of backpointer map elements. Indeed, one could even store backpointer map elements 86 within regular compressed blocks 57 in macroblocks 54 on storage 40.

As storage application 44 stores blocks 56, 57 sequentially within macroblocks 54, storage application 44 may temporarily buffer the macroblocks 54 in macroblock buffer 48 within memory 38. This allows an entire macroblock 54 to be written in one contiguous write operation.

As storage application 44 stores blocks 56, 57 sequentially within macroblocks 54, storage application 44 organizes the macroblocks 54 into segments 52. Each segment 52 contains a fixed number of macroblocks 54 (which, recall, have a fixed size). Storage application 44 is able to organize the segments 52 with reference to segment metadata 66 within memory 38. Whenever a newly-added macroblock 54 is created by storage application 44, storage application 44 may define a new segment 52 having a respective segment number 68, which indexes into segment metadata 66. Thus, primary persistent storage 40 may be logically organized into a number of segments 52. Recall that, in some embodiments, primary persistent storage 40 is configured to store up to eight petabytes ($2^{53}$ bytes) of application data, and in some embodiments, each macroblock has a fixed size of 1 megabyte, while in other embodiments, each macroblock has a fixed size of 64 kilobytes. In some embodiments in which each macroblock has a fixed size of 1 megabyte, each segment 52 may be configured to contain up to 128 macroblocks 54, for a total fixed segment size of 128 megabytes ($2^{27}$ bytes). In such embodiments, each segment 52 would have an associated 26-bit segment number 68, representing numbers from zero to $2^{26}-1$. Similarly, in some embodiments in which each macroblock has a fixed size of 64 kilobytes, each segment 52 may be configured to contain up to 32 macroblocks 54, for a total fixed segment size of 2 megabytes ($2^{21}$ bytes). In such embodiments, each segment 52 would have an associated 32-bit segment number 68, representing numbers from zero to $2^{32}-1$.

Example segment metadata 66 is depicted as a table indexed to the segment number 68, with several columns for metadata elements 70, 72, 74, 76. In other embodiments, each metadata element 70, 72, 74, 76 may be stored within a separate array indexed by the segment numbers 68, and in yet other embodiments, groups of metadata elements may be combined into a single such array. However, for purposes of simplicity of description, each metadata element 70, 72, 74, 76 will be described as being stored within a column of a table indexed to the segment number 68.

Macroblock map element 70 stores a fixed number of references to the macroblocks 54 which make up each segment 52. Thus, in the embodiment as depicted (in which each segment 52 includes eight macroblocks 54), if a segment 52 having segment number 68(*a*) contains macroblocks 54(*a*), 54(*b*), . . . , 54(*h*), with respective macroblock numbers 80(*a*), 80(*b*), . . . , 80(*h*), then the macroblock map 70(*a*) indexed by segment number 68(*a*) contains the macroblock numbers 80(*a*), 80(*b*), . . . , 80(*h*) in sequence. As storage application 44 inserts each macroblock 54 into a segment 52, storage application 44 inserts the respective macroblock number 80 for that macroblock 54 into the macroblock map element 70 for that segment 52.

Blocks written element 72 is a counter variable which counts the number of blocks 56, 57 which have been written to a segment 52 since it was initialized. Thus, once storage application 44 begins assigning new macroblocks 54 to a new segment 52, the counter is initialized to zero, and storage application 44 increments the counter of the blocks written element 72 for each block 56, 57 within the newly-added macroblock 54.

Similarly, blocks deleted element 74 is a counter variable which counts the number of blocks 56, 57 which have been deleted from a segment 52 since it was initialized. Thus, once storage application 44 begins assigning new macroblocks 54 to a new segment 52, the counter is initialized to zero, and storage application 44 increments the counter of the blocks deleted element 74 for every block 56, 57 that is deleted or rewritten (since rewritten blocks are written to a new location instead of being overwritten, effectively deleting the block at the initial location) from macroblocks 54 organized into that segment 52.

In some embodiments, a ratio 76 of the blocks deleted element 74 to the blocks written element 72 is also stored within the segment metadata 66 for each segment number 68. Higher ratios 76 tend to correspond to more highly fragmented segments.

Garbage collection module 46 operates by repeatedly calculating the ratio 76 for each segment 52 and deciding, based upon the calculated ratios 76, which segments 52 to schedule for defragmenting garbage collection. In some embodiments, whenever a ratio 76 for a given segment 52 exceeds a threshold value, that segment 52 is scheduled for defragmenting garbage collection. For example, in an environment in which a lack of fragmentation is desired at the expense of speed, a threshold value of 0.2 (20% fragmentation) may be used, while in an environment in which speed is prioritized heavily, a threshold value of 0.8 (80% fragmentation) may be used. In some embodiments, even once a particular segment 52 is scheduled for defragmenting garbage collection, certain segments 52 may be prioritized over other segments for defragmenting garbage collection by assigning more highly fragmented segments 52 to be scheduled first.

Figure 2A:
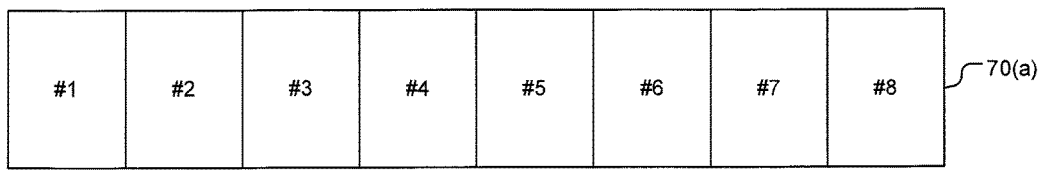
FIG. 2A depicts an example block layout at a first time for use in conjunction with various embodiments.
Figure 2A:
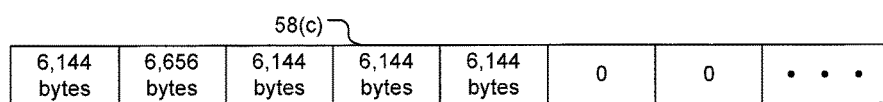
Figure 2A:
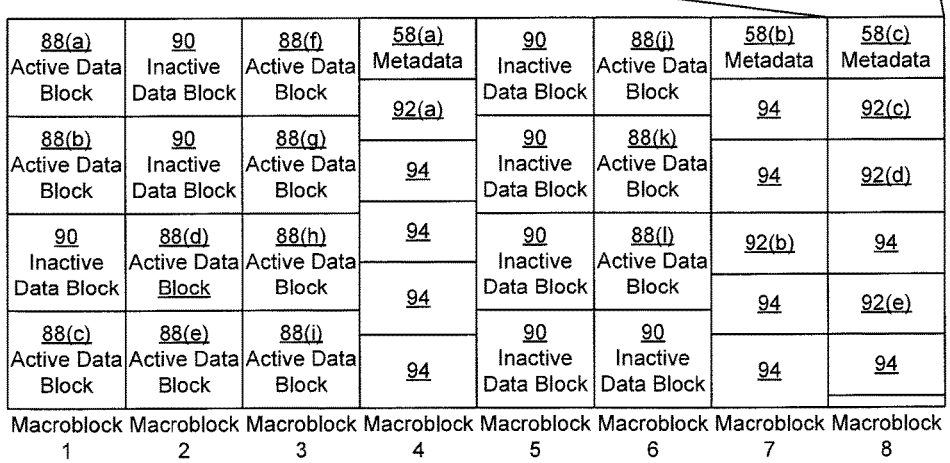
Figure 2A:
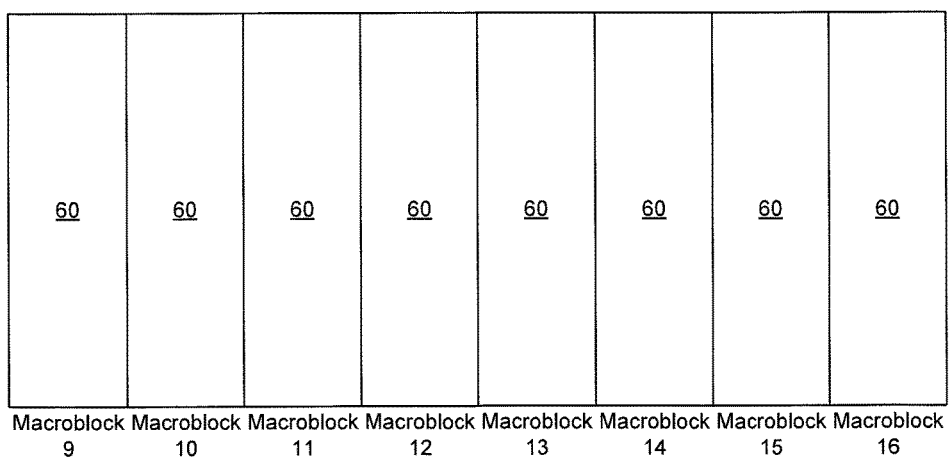
Figure 2B:
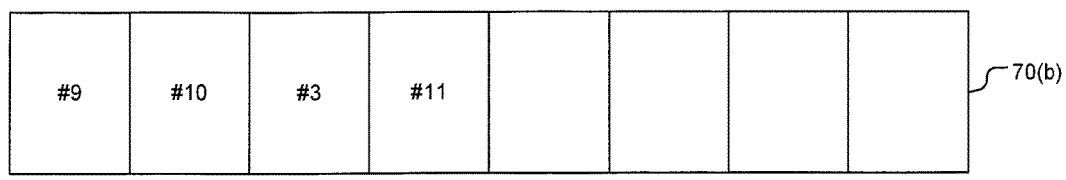
FIG. 2B depicts a revised example block layout upon performance of a method according to various embodiments.
Figure 2B:
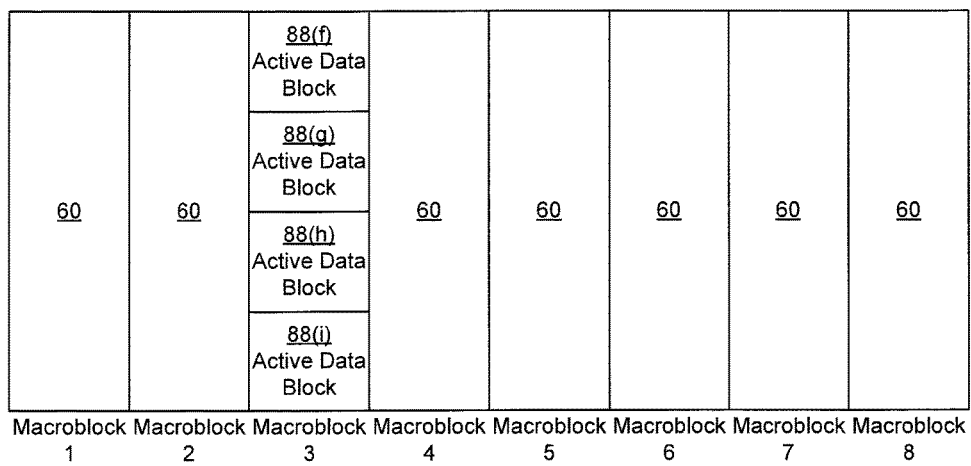
Figure 2B:
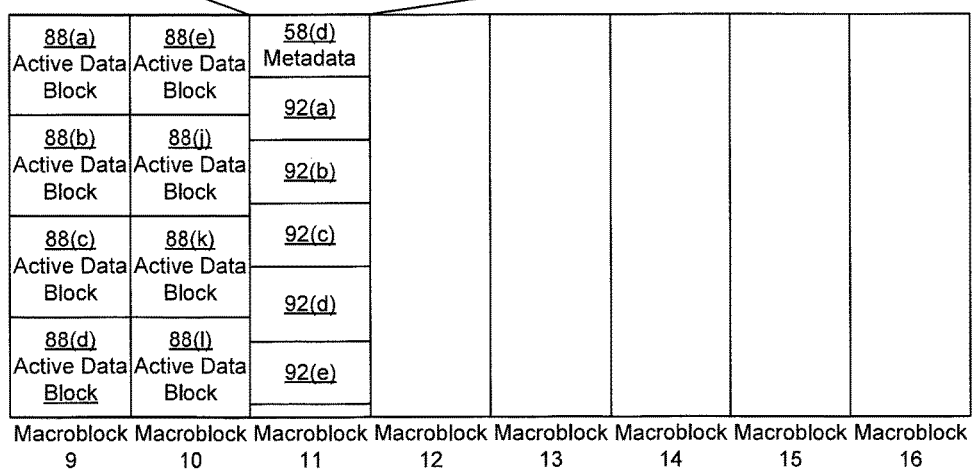

The process of defragmenting garbage collection may be illustrated with respect to FIGS. 2A and 2B.

FIG. 2A illustrates a layout of a particular first segment 52 and its associated macroblocks 54, 60 just prior to defragmenting garbage collection. First segment 52 with segment number 68(a) has respective macroblock map 70(a), which is depicted in FIG. 2A. The macroblock map 70(a) indicates that the first segment 52 is made up of macroblocks 1-8, sequentially. Macroblocks 54 numbered 1-8 are illustrated as being populated with both active and inactive blocks 56, 57, while macroblocks 60 numbered 9-16 are shown as being free.

Thus, macroblock 1, which is configured to contain uncompressed data blocks 56, contains three active data blocks 88(a), 88(b), and 88(c) together with one inactive (deleted or rewritten) data block 90. Similarly, macroblock 2, which is also configured to contain uncompressed data blocks 56, contains two active data blocks 88(d) and 88(e) together with two inactive data blocks 90, and macroblock 6, which is also configured to contain uncompressed data blocks 56, contains three active data blocks 88(f), 88(g), and 88(h) together with one inactive data block 90. Macroblock 5, which is configured to contain uncompressed data blocks 56, now contains no active data blocks 88, but is rather entirely made up of inactive data blocks 90.

Macroblocks 4, 7, and 8 are configured to contain compressed data blocks 57 of varying sizes following metadata headers 58. However, as depicted, many of the compressed data blocks 57 within macroblocks 4, 7, and 8 are inactive compressed blocks 94. Only a few active compressed data blocks 92 (depicted as active compressed data block 92(a) within macroblock 4, active compressed data block 92(b) within macroblock 7, and active compressed data blocks 92(c), 92(d), 92(e) within macroblock 8) remain.

FIG. 2A also illustrates example metadata header 58(c) for macroblock 8 in detail. Metadata header 58(c) includes a map of the sizes of the compressed blocks 57 within macroblock 8. This map has as many elements as permissible compressed blocks 57 are allowed within a given macroblock 52. In one embodiment, up to 63 compressed blocks are allowed within a macroblock 54. Thus, macroblock map 58(c) would have 63 elements. As depicted, each macroblock is 32 kilobytes in size (although, in other embodiments, other fixed sizes may be used), making each uncompressed block 56 eight kilobytes in size. Thus, each compressed block 57 must be smaller than eight kilobytes in size, and there must be at least five (i.e., more than four) compressed blocks 57 in any macroblock 54 configured to store compressed blocks 57. Thus, each element of the macroblock map should be able to store a size value up to 8,191 bytes, which would require 13 bits (assuming a single byte resolution for the size). Thus, in one embodiment, metadata header 58(c) includes 63 13-bit elements. In other embodiments, for ease of calculation, each element may be a short integer having 16 bits, so metadata header 58(c) includes 63 16-bit elements, which takes up to 126 bytes. Thus, in one embodiment the size of each metadata header 58 is fixed at one kilobyte (leaving room for other metadata), leaving 31 kilobytes available for compressed data blocks 57. Since macroblock 8 contains five compressed data blocks 57, only the first five elements of the metadata header 58(c) contain size values. As depicted, these first five values are 6,144 bytes, 6,656 bytes, 6,144 bytes, 6,144 bytes, and 6,144 bytes, in sequence. Since these values only sum to 30.5 kilobytes, there is an extra 512 bytes of unused space at the end of macroblock 8.

FIG. 2B illustrates a layout of a new second segment 52 and its associated macroblocks 54, 60 just after defragmenting garbage collection of the first segment 52 (defined by macroblock map 70(a) from FIG. 2A). Second segment 52 with segment number 68(b) has respective macroblock map 70(b). The macroblock map 70(b) indicates that the second segment 52 is made up of macroblocks 9, 10, 3, and 11, sequentially. Macroblocks 54 numbered 3 and 9-11 are illustrated as being populated with active blocks 56, 57, while macroblocks 60 numbered 1, 2, 4-8, and 12-16 are shown as being free. This is because active data blocks 88(a)-88(h) from macroblocks 1, 2, and 6 were compacted into just two new macroblocks 9 and 10 in the defragmenting garbage collection process, while active compressed data blocks 92(a)-92(e) from macroblocks 4, 7, and 8 were compacted into just one new macroblock 11 (with new metadata header 58(d) shown in detail). Because macroblocks 1, 2, 4, and 6-8 were compacted, these macroblocks were able to be freed. In addition, because macroblock 5 contained only inactive data blocks 90 prior to compaction, macroblock 5 was also able to be freed. However, since macroblock 3 did not contain any inactive data blocks 90, 92, but only active data blocks 88(f)-88(i), macroblock 3 is maintained in place, but transferred to the new unfragmented second segment 52 with segment number 70(b). Because inactive data has been removed (or, more accurately, not transferred), the second segment 52 has empty positions for additional macroblocks 54 to be inserted from the pool of free macroblocks 60 as new data is written by applications 42.

It should be understood that in order to efficiently pack variable-sized compressed blocks 57 from an initial set of macroblocks 54 into one or more new macroblocks 54, efficient bin-packing algorithms may be used. Examples of such efficient bin-packing algorithms may be found in "LOWER BOUNDS AND REDUCTION PROCEDURES FOR THE BIN PACKING PROBLEM" by Silvano Martello and Paolo Toth, published in Discrete Applied Mathematics 28 (1990) at pages 59-70, published by Elsevier Science Publishers B.V. (North-Holland), the entire contents and teachings of which are hereby incorporated by reference herein.

FIG. 3 illustrates an example method 100 according to various embodiments for defragmenting garbage collection in a DSS 32. It should be understood that any time a piece of software, such as, for example, storage application 44 or garbage collection module 46, is described as performing a method, process, step, or function, in actuality what is meant is that a computing device (e.g., DSS 32) on which that piece of software 44, 46 is running performs the method, process, step, or function when executing that piece of software on its processor 36.

It should be understood that, within FIG. 3, steps 110 and 140 are dashed because they are optional and not fundamental to method 100.

In preliminary step 110 of method 100, storage application 44 writes data blocks (e.g. 56, 57) to a storage device (e.g., primary persistent storage 40), pluralities of the blocks 56, 57 being organized into macroblocks 54, the macroblocks 54 having a first fixed size (e.g., 32 kilobytes, 64 kilobytes, or 1 megabyte), pluralities of the macroblocks 54 being organized into segments 52, segments having a second fixed size (e.g., 256 kilobytes, 2 megabytes, or 128 megabytes). As this is done, various sub-steps may also be performed.

In sub-step 111, as each additional data block 56, 57 is written to a macroblock 54 of a segment 52 by storage application 44, storage application 44 (in some embodiments, through the action of garbage collection module 46) increments a counter of the blocks written element 72 for that segment 52 within metadata 50 within memory 38, as described above.

In sub-step 113, as each additional data block 56, 57 is written to a macroblock 54 by storage application 44, storage application 44 updates the block-use map element 84 for that macroblock 54 within metadata 50 within memory 38 by marking that block 56, 57 as active, as described above.

In sub-steps 115-117, as each additional data block 56, 57 is written to a macroblock 54 by storage application 44, storage application 44 updates the backpointer map element 86 for that macroblock 54.

In particular, in sub-step 115, storage application 44 assigns a unique address to the newly-written data block 56, 57, the unique address identifying the macroblock 54 into which that block 56, 57 is organized and a position of the block 56, 57 within the macroblock 54. For example, the unique address may be a 64-bit value including the 33 or 37 bits of the macroblock number 80 and 6 bits of the block number within the macroblock 54 (recalling that, in some embodiments, there may be up to 63 compressed blocks 57 per macroblock 54).

In sub-step 116, storage application 44 sends the unique address for the newly-written data block 56, 57 to the application 42 which was responsible for writing that block 56, 57. In sub-step 117, which may be performed in parallel with sub-steps 115 and 116, storage application 44 stores, at an offset associated with the newly-written data block within the macroblock 54 in the backpointer map element 86 for the macroblock 54, a backpointer to the application 42 which was responsible for writing that block 56, 57, as described above.

In step 120, as the storage application 44 deletes or overwrites blocks 56, 57 on primary persistent storage 40, storage application 44 marks those blocks as deleted. In sub-step 121, storage application 44 (in some embodiments, through the action of garbage collection module 46) increments a counter of the blocks deleted element 74 for the respective segment 52 within metadata 50 within memory 38, as described above.

In sub-step 123, as each additional data block 56, 57 is deleted or rewritten from a macroblock 54 by storage application 44, storage application 44 updates the block-use map element 84 for that macroblock 54 within metadata 50 within memory 38 by marking that block 56, 57 as inactive, as described above.

In step 130, garbage collection module 46 computes a ratio 76 of storage marked as deleted as compared to storage written within a segment 52. Typically, this is done by dividing the counter of the blocks deleted element 74 by the counter of the blocks written element 72 for a given segment 52. However, in some embodiments, instead of using the numbers of blocks written and deleted, the numbers of bytes written and deleted or some other measures may be used.

In sub-step 131, it is indicated that step 130 is performed repeatedly for each segment 52 upon completing the ratio computation for all of the active segments 52. Alternatively, in sub-step 133, it is indicated that step 130 is performed for a given segment 52 after every n write and delete operations (combined) performed on that segment. For example, in one embodiment, n is equal to the maximum number of compressed blocks 57 allowed per segment (e.g., 63).

In some embodiments, garbage collection module 46 performs optional step 140, in which certain segments 52 with particularly high ratios 76 are prioritized for fragmenting garbage collection. Thus, either the ratios 76 are saved for each segment 52 within segment metadata 66 and compared or any segment 52 with a high enough ratio 76 (above a very high threshold) is prioritized.

In step 150, upon the calculated ratio 76 for a given segment 52 exceeding a threshold (and subject to any prioritization from step 140), garbage collection module 46 performs a garbage collection operation on the segment 52. This step may be accomplished through sub-steps 151-157.

In sub-step 151, garbage collection module 46 identifies macroblocks 54 within the segment 52 (on which defragmentation is being performed) that contain at least one block 56, 57 marked as deleted. This may be accomplished by counting the number of zero entries within the block use map element 84 for each macroblock 54 of the segment 52 under consideration. In the case of a macroblock 54 containing uncompressed blocks 56, only the first few entries of the block use map element 84 (corresponding to the fixed number of uncompressed blocks 56 that fit within a macroblock 54) are considered in this count. In the case of a macroblock 54 containing compressed blocks 57, only the entries of the block use map element 84 for which a block size has been defined are considered in this count. However, in some embodiments, all macroblocks 54 containing compressed blocks 57 are identified by sub-step 151, allowing the constituent compressed blocks 57 to be repacked most efficiently.

In sub-step 153, garbage collection module 46 copies active data blocks 88, 92 which have not been marked as deleted within the macroblocks 54 identified in sub-step 151 to a new macroblock 54 allocated from the pool of free macroblocks 60. This is repeated until all active data blocks 88, 92 which have not been marked as deleted within the macroblocks 54 identified in sub-step 151 have been copied to one or more new macroblocks 54.

In sub-step 155, upon copying the active data blocks in sub-step 153, the backpointer map elements 86 for the new macroblocks 54 must be created. Thus, a new respective unique address is assigned to the copied active data blocks 88, 92 based on their new respective locations, the new unique address is sent to the respective application 42 responsible for writing each copied active data block 88, 92, and the backpointer to the respective application 42 is saved to the appropriate offset within the backpointer map element 86 of the new macroblock 54.

In sub-step 157, the macroblocks 54 which were identified in sub-step 151 may be freed to the pool of free macroblocks 60, since the remaining active data blocks 88, 92 therein have now been moved to a new macroblock 54.

Finally (not depicted), the macroblock map element 70 for the segment 52 being compacted is updated to reflect the new macroblocks 54 therein.

Thus, techniques have been described for defragmenting garbage collection in a DSS 32. This is accomplished by organizing macroblocks 54 into larger segments 52, maintaining metadata 50 about writes 72 and deletions 74 performed on each segment 52, and performing a data compaction feature (step 150) on macroblocks 54 of a segment 52 when its metadata 50 indicates that it is highly fragmented.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method of reclaiming storage, the method comprising:
    writing blocks of data to a storage device, pluralities of the blocks of data being organized into macroblocks, macroblocks having a first fixed size, pluralities of the macroblocks being organized into segments, segments having a second fixed size;
    marking some of the written blocks as deleted;
    computing a ratio of storage marked as deleted (SMD) from a segment and storage written (SW) to the segment (ratio SMD:SW); and
    in response to the computed ratio exceeding a threshold value, performing a compaction operation on the segment, performing the compaction operation on the segment including:
        copying blocks which have not been marked as deleted from within macroblocks that contain at least one block marked as deleted to a new macroblock of the first fixed size; and
        in response to copying, marking the macroblocks from which the blocks were copied as free for reuse.

2. The method of claim 1 wherein computing the ratio includes dividing a number of blocks deleted from the segment by a number of blocks written to the segment.

3. The method of claim 1 wherein:
    writing blocks of data to the storage device includes, for each block written within a segment, incrementing a write counter associated with that segment; and
    marking some of the written blocks as deleted includes, for each block deleted within a segment, incrementing a delete counter associated with that segment.

4. The method of claim 3 wherein computing the ratio of storage marked as deleted from the segment and storage written to the segment includes performing a division operation by dividing the delete counter associated with that segment by the write counter associated with that segment.

5. The method of claim 4 wherein computing the ratio includes repeatedly performing the division operation for that segment upon iterating through all other segments of the data storage device.

6. The method of claim 4 wherein computing the ratio includes repeatedly performing the division operation for that segment every time a predefined number of combined write and delete operations are performed on that segment.

7. The method of claim 1 wherein:
    writing blocks of data to the storage device includes, for each block written within a segment, updating a block use metadata bitmap associated with the macroblock into which that block is organized to indicate that that block stores active data;
    marking some of the written blocks as deleted includes, for each block deleted within a segment, updating the block use metadata bitmap associated with the macroblock into which that block is organized to indicate that that block does not store active data; and
    performing the compaction operation on the segment further includes identifying the macroblocks that contain at least one block marked as deleted by counting, for each macroblock, whether the block use metadata bitmap for that macroblock indicates the presence of any blocks without active data.

8. The method of claim 7 wherein:
    at least one macroblock organized into the segment contains a predefined number of uncompressed blocks, the block use metadata bitmap associated with the at least one macroblock including exactly the predefined number of bit entries, each bit entry indicating whether or not a respective block stores active data; and
    for the at least one macroblock, counting whether the block use metadata bitmap for that macroblock indicates the presence of any blocks without active data includes determining whether or not the block use metadata bitmap associated with the at least one macroblock contains any bit entries indicating that a block does not store active data.

9. The method of claim 7 wherein:
    at least one macroblock organized into the segment contains a variable number of compressed blocks, the block use metadata bitmap associated with the at least one macroblock including a number of bit entries equal to a maximum number of compressed blocks allowed per macroblock, each bit entry up to the variable number indicating whether or not a respective block stores active data;
    the at least one macroblock includes a metadata header, the metadata header storing a compressed size for each compressed block within the at least one macroblock; and
    for the at least one macroblock, counting whether the block use metadata bitmap for that macroblock indicates the presence of any blocks without active data includes:
        calculating the variable number of compressed blocks within the at least one macroblock with reference to the metadata header of the at least one macroblock; and
        determining whether or not the block use metadata bitmap associated with the at least one macroblock contains any bit entries up to the calculated variable number indicating that a block does not store active data.

10. The method of claim 9 wherein copying blocks which have not been marked as deleted from within macroblocks that lack at least one block marked as deleted to the new macroblock of the first fixed size include:
    copying a compressed block from within the at least one macroblock to the new macroblock; and selecting additional compressed blocks from the at least one macroblock and other macroblocks in order to efficiently fill the new macroblock with minimal wasted space.

11. The method of claim 1 wherein the first fixed size is 64 kilobytes and the second fixed size is 2 megabytes.

12. The method of claim 1 wherein the first fixed size is 1 megabyte and the second fixed size is 128 megabytes.

13. The method of claim 1 wherein:
writing blocks of data to the storage device includes, for each block written:
assigning a unique address to that block, the unique address identifying the macroblock into which that block is organized and a position of that block within the macroblock;
sending the unique address of that block to an application which is responsible for writing that block; and
storing, within metadata for that block, a backpointer to the application which is responsible for writing that block; and
the method further includes, prior to marking the macroblocks from which the blocks were copied as free for reuse:
assigning a new unique address to that block within the new macroblock, the new unique address identifying the new macroblock and a position of that block within the new macroblock;
extracting the backpointer to the application which is responsible for writing that block from within the metadata for that block;
sending the new unique address of that block to the application which is responsible for writing that block, with reference to the backpointer; and
storing, within new metadata for that block within the new macroblock, the backpointer to the application which is responsible for writing that block.

14. The method of claim 1 wherein the method further includes prioritizing a segment for compaction by ordering segments by calculated from highest to lowest, the segment with the highest ratio being selected for earliest compaction.

15. A computer program product comprising a non-transitory computer-readable storage medium storing a set of instructions, which, when performed by a computing device, cause the computing device to perform the following operations:
writing blocks of data to a storage device, pluralities of the blocks of data being organized into macroblocks, macroblocks having a first fixed size, pluralities of the macroblocks being organized into segments, segments having a second fixed size;
marking some of the written blocks as deleted;
computing a ratio of storage marked as deleted (SMD) from a segment and storage written (SW) to the segment (ratio SMD:SW); and
in response to the computed ratio exceeding a threshold value, performing a compaction operation on the segment, performing the compaction operation on the segment including:
copying blocks which have not been marked as deleted from within macroblocks that contain at least one block marked as deleted to a new macroblock of the first fixed size; and
in response to copying, marking the macroblocks from which the blocks were copied as free for reuse.

16. An apparatus comprising:
persistently-backed system memory;
a data storage device; and
processing circuitry configured to perform the following operations:
writing blocks of data to the data storage device, pluralities of the blocks of data being organized into macroblocks, macroblocks having a first fixed size, pluralities of the macroblocks being organized into segments, segments having a second fixed size;
marking, within the persistently-backed system memory, some of the written blocks as deleted;
computing a ratio of storage marked as deleted (SMD) from a segment and storage written (SW) to the segment (ratio SMD:SW); and
in response to the computed ratio exceeding a threshold value, performing a compaction operation on the segment, performing the compaction operation on the segment including:
copying blocks which have not been marked as deleted from within macroblocks that contain at least one block marked as deleted to a new macroblock of the first fixed size; and
in response to copying, marking the macroblocks from which the blocks were copied as free for reuse.

17. The method of claim 1 wherein the storage device stores a plurality of segments and the second fixed size exceeds the first fixed size.

18. The method of claim 1 wherein the blocks store data having a third fixed size, the third fixed size being smaller than the first fixed size.

19. The method of claim 18 wherein:
the third fixed size is in the range of 8 kilobytes (KB) to 64 KB;
the first fixed size is in the range of 32 KB to 1 megabyte (MB); and
the second fixed size is in the range of 2 MB to 128 MB.

20. The method of claim 19 wherein the storage device has a capacity that is at least 320 MB.

* * * * *